US012801896B2

(12) United States Patent
Kingma et al.

(10) Patent No.: US 12,801,896 B2
(45) Date of Patent: Nov. 17, 2026

(54) DIFFUSION MODELS HAVING IMPROVED ACCURACY AND REDUCED CONSUMPTION OF COMPUTATIONAL RESOURCES

(71) Applicant: Google LLC, Mountain View, CA (US)

(72) Inventors: Diederik Pieter Kingma, San Francisco, CA (US); Tim Salimans, Utrecht (NL)

(73) Assignee: GOOGLE LLC, Mountain View, CA (US)

( * ) Notice: Subject to any disclaimer, the term of this patent is extended or adjusted under 35 U.S.C. 154(b) by 865 days.

(21) Appl. No.: 18/012,195

(22) PCT Filed: Jun. 13, 2022

(86) PCT No.: PCT/US2022/033253

§ 371 (c)(1),
(2) Date: Dec. 21, 2022

(87) PCT Pub. No.: WO2022/265992

PCT Pub. Date: Dec. 22, 2022

(65) Prior Publication Data

US 2023/0267315 A1 Aug. 24, 2023

Related U.S. Application Data

(60) Provisional application No. 63/210,314, filed on Jun. 14, 2021.

(51) Int. Cl.
*G06N 3/0455* (2023.01)
*G06N 3/047* (2023.01)
*G06N 3/0475* (2023.01)

(52) U.S. Cl.
CPC .......... *G06N 3/0455* (2023.01); *G06N 3/047* (2023.01); *G06N 3/0475* (2023.01)

(58) Field of Classification Search
CPC ..... G06N 3/0455; G06N 3/047; G06N 3/0475
See application file for complete search history.

(56) References Cited

U.S. PATENT DOCUMENTS

2022/0405583 A1* 12/2022 Vahdat .................. G06N 3/088

OTHER PUBLICATIONS

Kong, Zhifeng, et al. "Diffwave: A versatile diffusion model for audio synthesis." arXiv preprint arXiv:2009.09761 (2020). (Year: 2020).*

(Continued)

*Primary Examiner* — Hal Schnee
(74) *Attorney, Agent, or Firm* — DORITY & MANNING P.A.

(57) ABSTRACT

A computer-implemented method for use of a diffusion model having improved accuracy comprises obtaining input data, the input data comprising one or more channels; providing the input data to a machine-learned diffusion model, the machine-learned diffusion model comprising: a noising model comprising a plurality of noising stages, the noising model configured to introduce noise to receive the input data and produce intermediate data in response to receipt of the input data; and a denoising model configured to reconstruct output data from the intermediate data; and receiving, by the computing system, the output data from the machine-learned diffusion model. The diffusion model can include a learned noise schedule. Additionally and/or alternatively, input to the denoising model can include a set of Fourier features. Additionally and/or alternatively, the diffusion model can be trained based at least in part on a continuous-time loss for an evidence lower bound.

22 Claims, 5 Drawing Sheets

(56) References Cited

OTHER PUBLICATIONS

Dupont, Emilien, Yee Whye Teh, and Arnaud Doucet. "Generative models as distributions of functions." arXiv preprint arXiv:2102.04776 (2021). (Year: 2021).*
Wang, Shaogang, Vishal M. Patel, and Athina Petropulu. "Multidimensional sparse Fourier transform based on the Fourier projection-slice theorem." IEEE Transactions on Signal Processing 67.1 (2018): 54-69. (Year: 2018).*
International Preliminary Report on Patentability for Application No. PCT/US2022/033253, mailed Dec. 28, 2023, 15 pages.
Ho et al, "Denoising Diffusion Probabilistic Models", arXiv:2006.11239v2, Dec. 16, 2020, 26 pages.
International Search Report for Application No. PCT/ US2022/033253, mailed on Dec. 1, 2022, 7 pages.
Song et al, "Score-Based Generative Modeling Through Stochastic Differential Equations", arXiv:2011.13456v2, Feb. 10, 2021, 36 pages.
Tancik et al, "Fourier Features let Networks Learn High Frequency Functions in Low Dimensional Domains", arXiv:2006.10739v1, Jun. 18, 2020, 24 pages.
Extended European Search Report for Application No. EP 25152327.0, mailed May 15, 2025, 10 pages.
Sohl-Dickstein et al., "Deep Unsupervised Learning Using Nonequilibrium Thermodynamics", arXiv:1503.03585v8, Nov. 18, 2015, 18 pages.
Song et al., "Maximum Likelihood Training of Score-Based Diffusion Models", arXiv:2101.09258v2, Jun. 4, 2021, 21 pages.
Durkan et al., "On Maximum Likelihood Training of Score-Based Generative Models", arXiv:2101.09258, Jan. 22, 2021, 15 Pages.

* cited by examiner

DIFFUSION MODELS HAVING IMPROVED ACCURACY AND REDUCED CONSUMPTION OF COMPUTATIONAL RESOURCES

CROSS-REFERENCE TO RELATED APPLICATIONS

This application is based upon and claims the right of priority under 35 U.S.C. § 371 to International Application No. PCT/US2022/033253 filed on Jun. 13, 2022, which is based on and claims priority to and the benefit of U.S. Provisional Patent Application No. 63/210,314, filed Jun. 14, 2021. Applicant claims priority to and the benefit of each of such applications and incorporates all such applications herein by reference in its entirety.

RELATED APPLICATIONS

This application claims priority to and the benefit of U.S. Provisional Patent Application No. 63/210,314, filed Jun. 14, 2021. U.S. Provisional Patent Application No. 63/210, 314 is hereby incorporated by reference in its entirety.

FIELD

The present disclosure relates generally to machine-learning. More particularly, the present disclosure relates to diffusion models having improved accuracy.

BACKGROUND

Likelihood-based generative modeling is a central task in machine learning that is the basis for a range of applications. Autoregressive models have long been the dominant model class on this task due to their tractable likelihood and expressivity. Diffusion models are a class of machine-learned models that include a noising model and a denoising model. Diffusion models have yet to match autoregressive models on density estimation benchmarks.

SUMMARY

Aspects and advantages of embodiments of the present disclosure will be set forth in part in the following description, or can be learned from the description, or can be learned through practice of the embodiments.

One example aspect of the present disclosure is directed to a computing system that leverages Fourier features for improved fine scale prediction. The computing system includes one or more processors and one or more non-transitory, computer-readable media that collectively store: at least a denoising model of a machine-learned diffusion model, the diffusion model comprising: a noising model comprising a plurality of noising stages, the noising model configured to receive input data and produce latent data in response to receipt of the input data; and the denoising model configured to reconstruct output data from the latent data; wherein input to the denoising model comprises a set of Fourier features comprising a linear projection of channels of at least one stage of the plurality of noising stages; and instructions that, when executed by the one or more processors, cause the computing system to execute the denoising model to process the latent data to generate the output data.

Another example aspect of the present disclosure is directed to a computer-implemented method for use of a diffusion model having improved accuracy, the method comprising: obtaining, by a computing system comprising one or more computing devices, input data, the input data comprising one or more channels; providing, by the computing system, the input data to a machine-learned diffusion model, the machine-learned diffusion model comprising: a noising model comprising a plurality of noising stages, the noising model configured to introduce noise to receive the input data and produce intermediate data in response to receipt of the input data; and a denoising model configured to reconstruct output data from the intermediate data; wherein input to the denoising model comprises a set of Fourier features comprising a linear projection of channels of at least one stage of the plurality of noising stages; and receiving, by the computing system, the output data from the machine-learned diffusion model.

Another example aspect of the present disclosure is directed to one or more non-transitory, computer-readable media collectively storing at least a noising model of a diffusion model, the diffusion model comprising: the noising model comprising a plurality of noising stages, the noising model configured to introduce noise to input data according to a noise schedule to produce intermediate data; and a denoising model configured to reconstruct output data from the intermediate data; wherein the noise schedule is a learned noise schedule that comprises one or more learned parameter values.

Another example aspect of the present disclosure is directed to a computer-implemented method for use of a diffusion model having improved accuracy, the method comprising: obtaining, by a computing system comprising one or more computing devices, input data, the input data comprising one or more channels; providing, by the computing system, the input data to a machine-learned diffusion model, the machine-learned diffusion model comprising: a noising model comprising a plurality of noising stages, the noising model configured to introduce noise to receive the input data and produce intermediate data in response to receipt of the input data; and a denoising model configured to reconstruct output data from the intermediate data; wherein the diffusion model comprises a learned noise schedule; and receiving, by the computing system, the output data from the machine-learned diffusion model.

Another example aspect of the present disclosure is directed to a computer-implemented method for training a diffusion model while consuming fewer computational resources, the method comprising: obtaining, by a computing system comprising one or more computing devices, training data, the training data comprising one or more channels; providing, by the computing system, the training data to a machine-learned diffusion model, the machine-learned diffusion model comprising: a noising model comprising a plurality of noising stages, the noising model configured to introduce noise to receive the training data and produce intermediate data in response to receipt of the training data; and a denoising model configured to reconstruct output data from the intermediate data; and determining, by the computing system, a training loss based at least in part on use of the machine-learned diffusion model with the training data, wherein the diffusion model is trained by optimizing parameters of the machine-learned diffusion model towards an evidence lower bound, wherein the evidence lower bound comprises a continuous-time loss.

Another example aspect of the present disclosure is directed to a computer-implemented method for use of a diffusion model having improved accuracy, the method comprising: receiving compressed data; and decompressing the compressed data with a denoising model that has been trained as part of a diffusion model; wherein at least one of: 1) input to the denoising model comprises one or more Fourier features; 2) the denoising model comprises a learned noise schedule; or 3) the denoising model is trained using a continuous time loss function.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
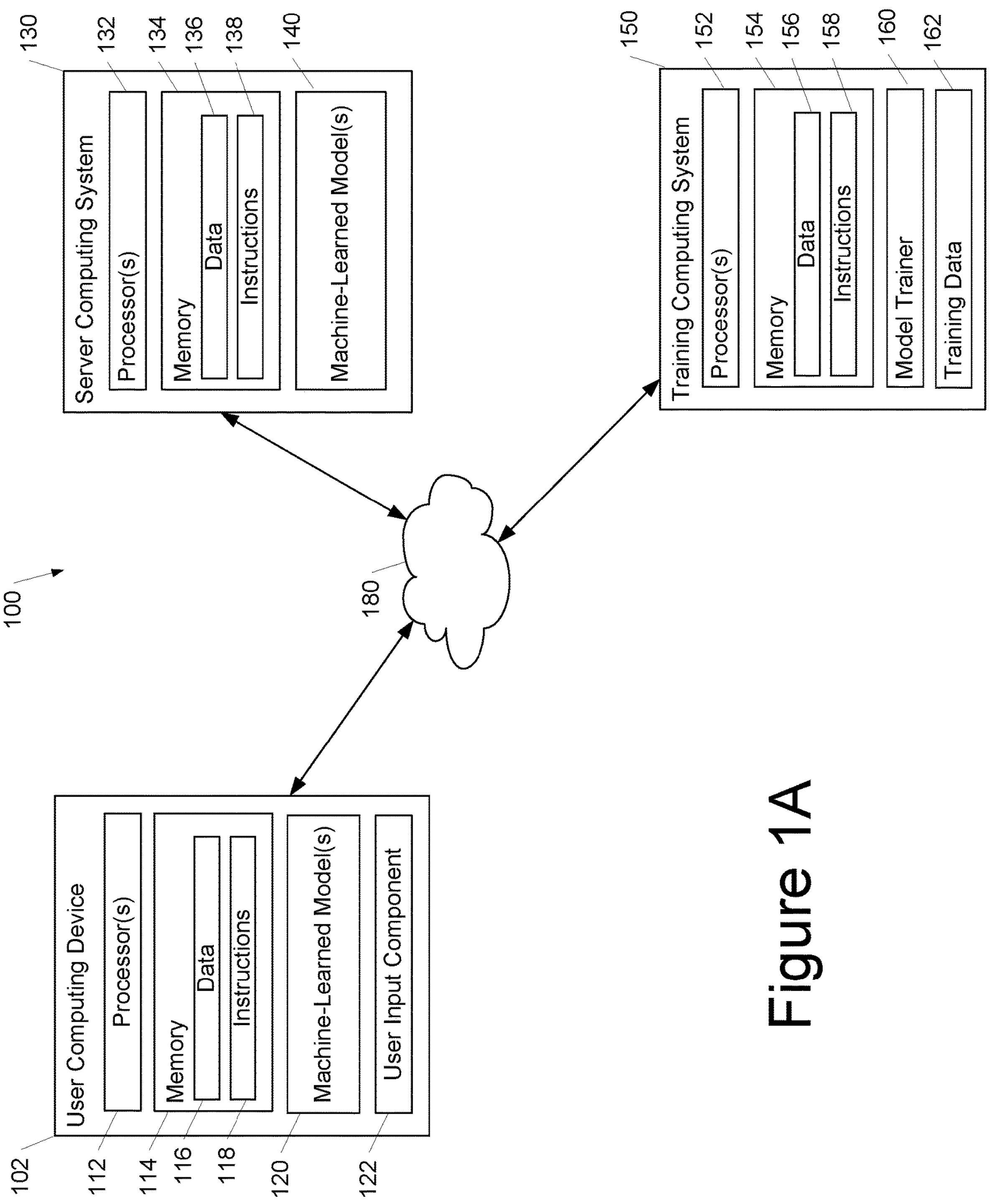
FIG. 1A depicts a block diagram of an example computing system according to example embodiments of the present disclosure.

Reference numerals that are repeated across plural figures are intended to identify the same features in various implementations.

DETAILED DESCRIPTION

Generally, the present disclosure is directed to a flexible family of diffusion-based models (e.g., generative models) that achieves state-of-the-art performance, such as state-of-the-art likelihoods on image density estimation benchmarks. Models according to example aspects of the present disclosure provide for efficient optimization of the noise schedule jointly with the rest of the diffusion model. Additionally, the evidence lower bound (ELBO) for the model can be simplified to a relatively short expression with respect to the signal-to-noise ratio (or noise schedule). This improved understanding provides for the development of a continuous-time evidence lower bound that can be optimized to improve model accuracy. In addition, the continuous-time ELBO can be invariant to noise schedule other than at the endpoints of the signal-to-noise ratio. This provides for learning a noise schedule that minimizes the variance of the resulting ELBO estimator, which can provide for faster optimization. Example models according to example aspects of the present disclosure can additionally include a set of Fourier features at the input of a denoising model, which can improve accuracy results.

Likelihood-based generative modeling is a central task in machine learning that can be applied to a wide range of applications, including, for example, speech synthesis, translation, compression, among others. Autoregressive models have been proven for these tasks due to tractable likelihood and expressivity. Diffusion models have shown impressive results in image generation and audio generation, especially for perceptual quality, but have conventionally not matched in density estimation benchmarks. Example aspects of the present disclosure provide for technical contributions to improve diffusion models' competitiveness in this domain.

One example aspect of the present disclosure is directed to diffusion-based generative models that incorporate Fourier features into the diffusion model. Another example aspect of the present disclosure is directed to diffusion-based generative models that employ a learnable specification of the diffusion process, referred to herein as a "noise schedule." Another example aspect of the present disclosure is directed to diffusion-based generative models that employ a novel continuous-time evidence lower bound (ELBO). This provides for these models to achieve improved performance, including new state-of-the-art log-likelihoods on image density estimation benchmarks without data augmentation.

Example aspects of the present disclosure are directed to diffusion probabilistic models (DPMs) also referred to as diffusion models. Diffusion models can include a noising model that introduces noise to input data to obfuscate the input data after a number of stages, or "timesteps." This model can be or can include a finite number of steps T or an infinite number of steps as $T\rightarrow\infty$. Example aspects of the present disclosure recognize that a greater number of steps provides improved performance on likelihoods. For instance, the noising model can include a plurality of noising stages (e.g., layers) where each consecutive layer is noisier than previous layers. For instance, the noising model can be configured to introduce noise to input data to produce intermediate data.

The diffusion model can additionally and/or alternatively include a denoising model that can produce samples matching the input data after a number of stages. For instance, the diffusion model may include Markov chains at the noising model and/or denoising model. The diffusion models may be implemented in discrete time, e.g., where each layer corresponds to a timestep. The diffusion model may also be implemented in arbitrarily deep (e.g., continuous) time. For instance, the model may be fully Gaussian such that an unbiased estimate of the objective function can be obtained from a single layer. It is thus possible to avoid computing intermediate layers. Diffusion models can be conceptually similar to a variational autoencoder (VAE) whose structure and loss function provides for efficient training of arbitrarily deep (e.g., infinitely deep) models. The diffusion model can be trained using variational inference. In particular, example aspects of the present disclosure recognize the evidence lower bound of a diffusion model, and employ a continuous-time evidence lower bound to train the diffusion model with improved performance.

The diffusion model can be or can include one or more latent variables forming a latent variable model. This can be extended to multiple observed variables, estimating conditional densities (e.g., $p(x|y)$), etc. The diffusion model can include a diffusion process (e.g., the noising model) that is inverted to obtain a generative model (e.g., the denoising model).

According to example aspects of the present disclosure, a computer-implemented method for using a diffusion model can include obtaining, by a computing system including one or more computing devices, input data. In some implementations, the input data can include one or more channels. For example, one case of generative modeling involves a dataset of observations of x, in which the task is to estimate the marginal distribution p(x). For instance, the diffusion model can receive the data x and sample a sequence of latent variables $z_t$ given x. The timestep t can run forward in time from t=0 to t=1. The distribution of a latent variable $z_t$ at a timestep t can be given by:

$$q(z_t \mid x) = \mathcal{N}(a_t x, \sigma_t^2 I)$$

where α is the mean of the marginal distribution, and $$\sigma_t^2$$

is the variance of the marginal distribution. The mean and/or the variance may be smooth such that their derivatives with respect to t are finite. Additionally, the signal-to-noise ratio (SNR)

$$\alpha_t^2 / \sigma_t^2,$$

also referred to as the noise schedule, can be monotonically decreasing over t. More generally, the noise schedule can additionally and/or alternatively refer separately to the mean and/or variance, and/or any other suitable ratio of the quantities. The joint distribution of latent variables at subsequent timesteps is distributed as a first-order Markov chain.

The diffusion model can further include a denoising model configured to reconstruct output data from the intermediate data. For example, the diffusion process can be inverted to produce a generative model (e.g., a denoising model). For instance, the generative model can be a hierarchical model that samples a sequence of latent variables with time running backwards from t=1 to t=0.

The model parameters can be optimized by maximizing the variational lower bound of the marginal log-likelihood. This is also referred to as the evidence lower bound (ELBO). According to example aspects of the present disclosure, the inference model parameters that define the forward-time diffusion process can be optimized jointly with the rest of the model. An example negative marginal log-likelihood is bounded by the sum of a prior loss, a reconstruction loss, and a diffusion loss. The prior loss is a KL divergence between two Gaussians, and may be computed in closed form. The denoising model loss can be evaluated and optimized using reparameterization gradients. The diffusion loss can depend on the number of timesteps.

According to example aspects of the present disclosure, input to the denoising model comprises a set of Fourier features comprising a linear projection of channels of at least one stage of the plurality of noising stages. The set of Fourier features can include a linear projection of the channels of each of the plurality of noising stages. For instance, the set of Fourier features can include a linear projection of at least one stage of the plurality of noising stages onto a set of periodic basis functions with high frequency. Intuitively, the set of Fourier features can provide for improved understanding of fine-scale details of the input data. In some implementations, the set of Fourier features can include four channels. For example, the set of Fourier features comprises at least one Fourier feature of the form $$f_{i,j,k}^q = \sin(z_{i,j,k} 2^q \pi),$$

where q is a frequency exponent of the Fourier feature, i and j are position indices, k is a channel index, and $z_{i,j,k}$ is a network input at the position indices and channel index. Additionally and/or alternatively, the set of Fourier features can include at least one Fourier feature of the form $$g_{i,j,k}^q = \cos(z_{i,j,k} 2^q \pi),$$

where q is a frequency exponent of the Fourier feature, i and j are position indices, k is a channel index, and $z_{i,j,k}$ is a network input at the position indices and channel index. These Fourier features can have one or more frequencies based on the choice of q. In some implementations, for instance, the input data can have a bit length, and the set of Fourier features can include Fourier features having each frequency exponent from one to the bit length. Additionally and/or alternatively, in some implementations, the input data can include a bit length of eight or greater, and the set of Fourier features can include Fourier features having each frequency exponent from seven to the bit length. As an example, if the input data is represented in eight-bit bites, the bit length may be 8, and the four channels of the Fourier features may include an f and g feature having frequencies of $2^7$ and $2^8$. The use of only higher frequencies (e.g., greater than $2^7$) can provide for faster training of the model.

According to example aspects of the present disclosure, the diffusion model can include a learned noise schedule. The noise schedule can include at least one or both of a mean of a marginal distribution of the diffusion model and/or a variance of the marginal distribution. For instance, in some implementations, the learned noise schedule includes a ratio of a squared mean of a marginal distribution of the diffusion model to a squared variance of the marginal distribution. For example, the learned noise schedule can be a signal-to-noise ratio function. The learned noise schedule can be learned jointly with the diffusion model such as being learned jointly with the noising model and/or the denoising model.

In some implementations, the learned noise schedule can be parameterized by a monotonically increasing function. For instance, in some implementations, the signal-to-noise ratio can be parameterized by SNR (t)=exp $(-\gamma_\eta(t))$ where $\gamma_\eta(t)$ is the monotonically increasing function. Parameters η of the monotonically increasing function can be learned jointly with the diffusion model. For instance, in some implementations (e.g., in the discrete-time case), the parameters can be learned by maximizing the ELBO together with other model parameters. In the continuous-time case, in which the diffusion loss is invariant to the signal-to-noise ratio except for its endpoints, the parameters are learned by optimizing with respect to the endpoints (e.g., rather than the parameters of the schedule interpolating between them). For instance, in some implementations, the parameters can be learned by minimizing the variance, such as by performing stochastic gradient descent on the squared diffusion loss. This gradient can be calculated with relatively low computational overhead as a by-product of calculating the gradient of the ELBO.

The monotonically increasing function can be any suitable function according to example aspects of the present disclosure. In some implementations, the monotonically increasing function can be a monotonically increasing neural network. In some implementations, the monotonically increasing neural network comprises one or more linear layers that are restricted to be positive. For instance, in some implementations, the monotonically increasing neural network is represented by:

$$\tilde{\gamma}_\eta = l_1(t) + l_3(\phi(l_2(l_1(t))))$$

where $l_i(t)$ is an ith layer of the monotonically increasing neural network at a timestep t, and wherein $\phi$ is a sigmoid function. In some implementations, the $l_2$ layer can have 1024 outputs and the other layers can have a single output. In some implementations the monotonically increasing neural network is postprocessed as:

$$\gamma_\eta = \gamma_0 + (\gamma_1 - \gamma_0) * \frac{\tilde{\gamma}_\eta(t) - \tilde{\gamma}_\eta(0)}{\tilde{\gamma}_\eta(1) - \tilde{\gamma}_\eta(0)}$$

where $\gamma_0 = -\log(\mathrm{SNR}_{max})$ and $\gamma_1 = -\log(\mathrm{SNR}_{min})$ such that a range of the monotonically increasing neural network is restricted to $[\mathrm{SNR}_{min}, \mathrm{SNR}_{max}]$, and wherein $\gamma_0$ and $\gamma_0$ are optimized jointly with parameters of the denoising model. For instance, the postprocessing can bound the range of the neural network.

In some implementations, the derivative of the loss function with respect to the noise schedule is computed along with gradients of the other parameters of the diffusion model without a second backpropagation pass through the denoising model. In some implementations, parameters of the learned noise schedule are learned by maximizing an evidence lower bound together with other parameters of the diffusion model. In some implementations, the diffusion model is a continuous time diffusion model, and wherein the parameters of the learned noise schedule are learned by optimizing an evidence lower bound with respect to endpoints of the learned noise schedule. In some implementations, parameters of the learned noise schedule are learned by minimizing variance by performing stochastic gradient descent on a squared diffusion loss.

According to example aspects of the present disclosure, the diffusion model can be trained by optimizing parameters of the machine-learned diffusion model towards the evidence lower bound, wherein the evidence lower bound comprises a continuous-time loss. In some implementations, the continuous-time loss is approximated using an unbiased estimator of the continuous-time loss. In some implementations, the unbiased estimator comprises a Monte Carlo estimator. In some implementations, the continuous-time loss comprises infinite depth.

For instance, example aspects of the present disclosure provide that the evidence lower bound improves for a greater number of time steps. In the continuous-time case (e.g., thus having infinite depth), the ELBO may thus achieve improved performance. In the case when the timesteps are infinite, the diffusion loss can be simplified, thus providing for practical implementations, as described in U.S. Provisional Patent Application No. 63/210,314. In some implementations, because evaluating an infinite integral may be computationally intractable, an unbiased Monte Carlo estimator can be used in place of the diffusion loss.

In some implementations, the input data can include data to be compressed, and the output data can be reconstructed input data. For instance, the input data can be provided to the diffusion model (e.g., the noising model). The intermediate data can be stored as a compressed representation. A different device and/or the same device may then access the intermediate data and provide the intermediate data as input to the denoising model. The output data from the denoising model can thus be reconstructed input data. As one example, the diffusion model may be used for image compression. For instance, the input data and/or the output data can include image data. The diffusion model may also be used for other types of data compression, such as audio data, text data, multimodal data, etc. The diffusion model may also be used for generation of signals (e.g., images). For example, the denoising model may be employed as a generative model to generate data (e.g., image data) from an input signal (e.g., an input distribution). The denoising model may be trained with the noising model and then employed as a standalone model. For instance, the denoising model may be useful for noising images, image infilling, or other image manipulation, audio/text infilling or noising or other manipulation, translation, text to image, image to text, transcribing speech, or other prediction of high dimensional signal conditioned on an input signal.

Systems and methods according to example aspects of the present disclosure can provide a number of technical effects and benefits, including improvements to computing technology. For example, diffusion models according to example aspects of the present disclosure can achieve improved performance, such as improved likelihoods. As examples, in data compression, systems and methods according to example aspects of the present disclosure can provide for improved compression ratio, such as fewer bits required to store compressed data relative to existing systems.

As another example technical effect and benefit, systems and methods according to example aspects of the present disclosure can enable reduced consumption of computational resources when training a diffusion model. For example, a learned noise schedule as described herein can minimize the variance of the resulting ELBO estimator, leading to faster optimization. Faster optimization results in less consumption of computational resources such as memory usage, processor usage, etc. Similarly, inclusion of Fourier features may also enable faster training. As another example, the use of a continuous-time loss can enable training to occur in which fewer time steps need to be performed and/or evaluated. Performing and/or evaluating fewer time steps results in less consumption of computational resources such as memory usage, processor usage, etc.

With reference now to the Figures, example embodiments of the present disclosure will be discussed in further detail.

FIG. 1A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more diffusion models 120. For example, the diffusion models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example diffusion models 120 are discussed with reference to FIGS. 2-3.

In some implementations, the one or more diffusion models 120 can be received from the server computing system 130 over network 180, stored in the user computing device memory 114, and then used or otherwise implemented by the one or more processors 112. In some implementations, the user computing device 102 can implement multiple parallel instances of a single diffusion model 120.

Additionally or alternatively, one or more diffusion models 140 can be included in or otherwise stored and implemented by the server computing system 130 that communicates with the user computing device 102 according to a client-server relationship. For example, the diffusion models 140 can be implemented by the server computing system 140 as a portion of a web service (e.g., an image generation service). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more diffusion models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 140 are discussed with reference to FIGS. 2-3.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the diffusion models 120 and/or 140 based on a set of training data 162. The training data 162 can include, for example, image data, audio data, etc.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
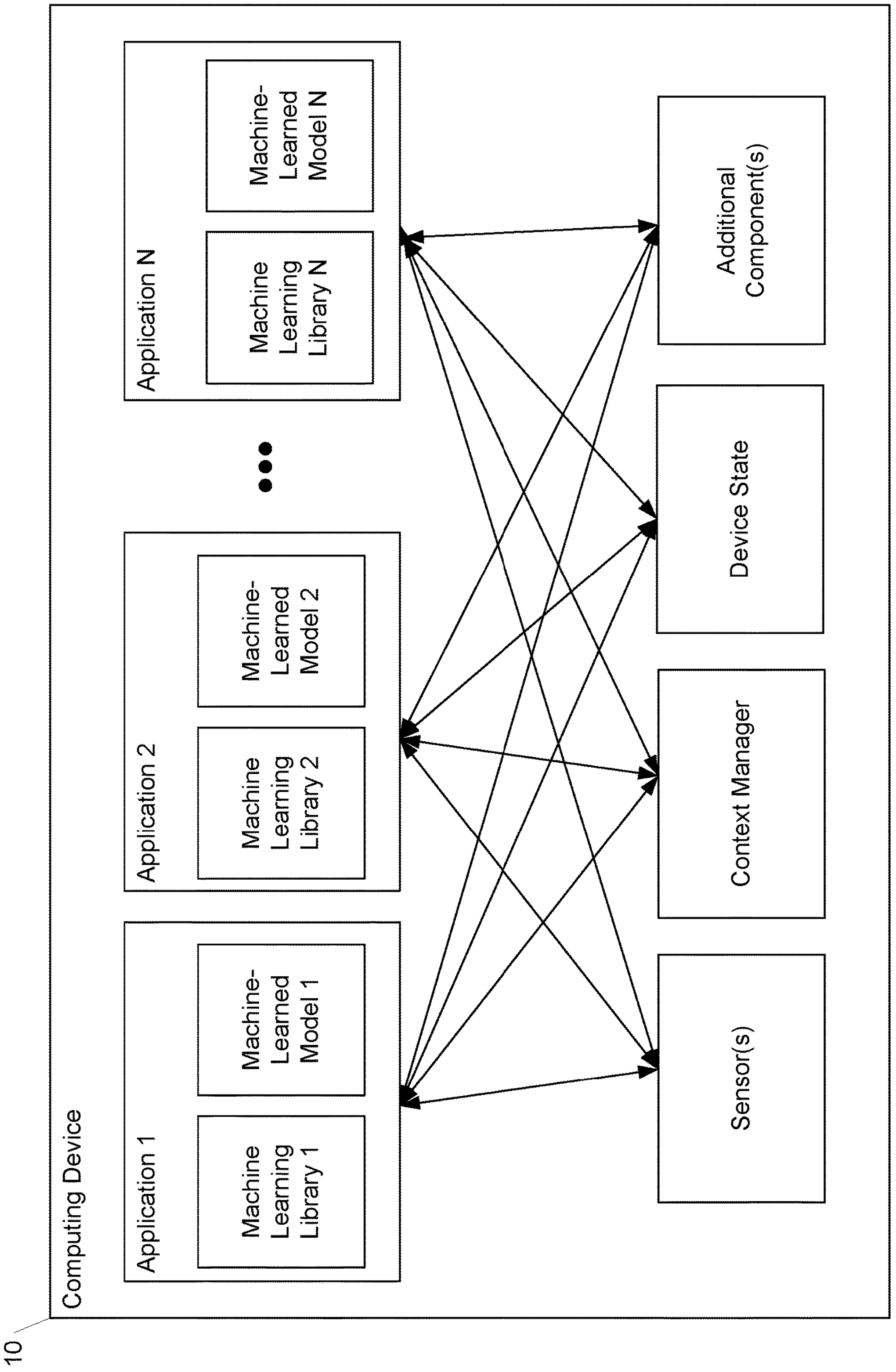
FIG. 1B depicts a block diagram of an example computing device according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
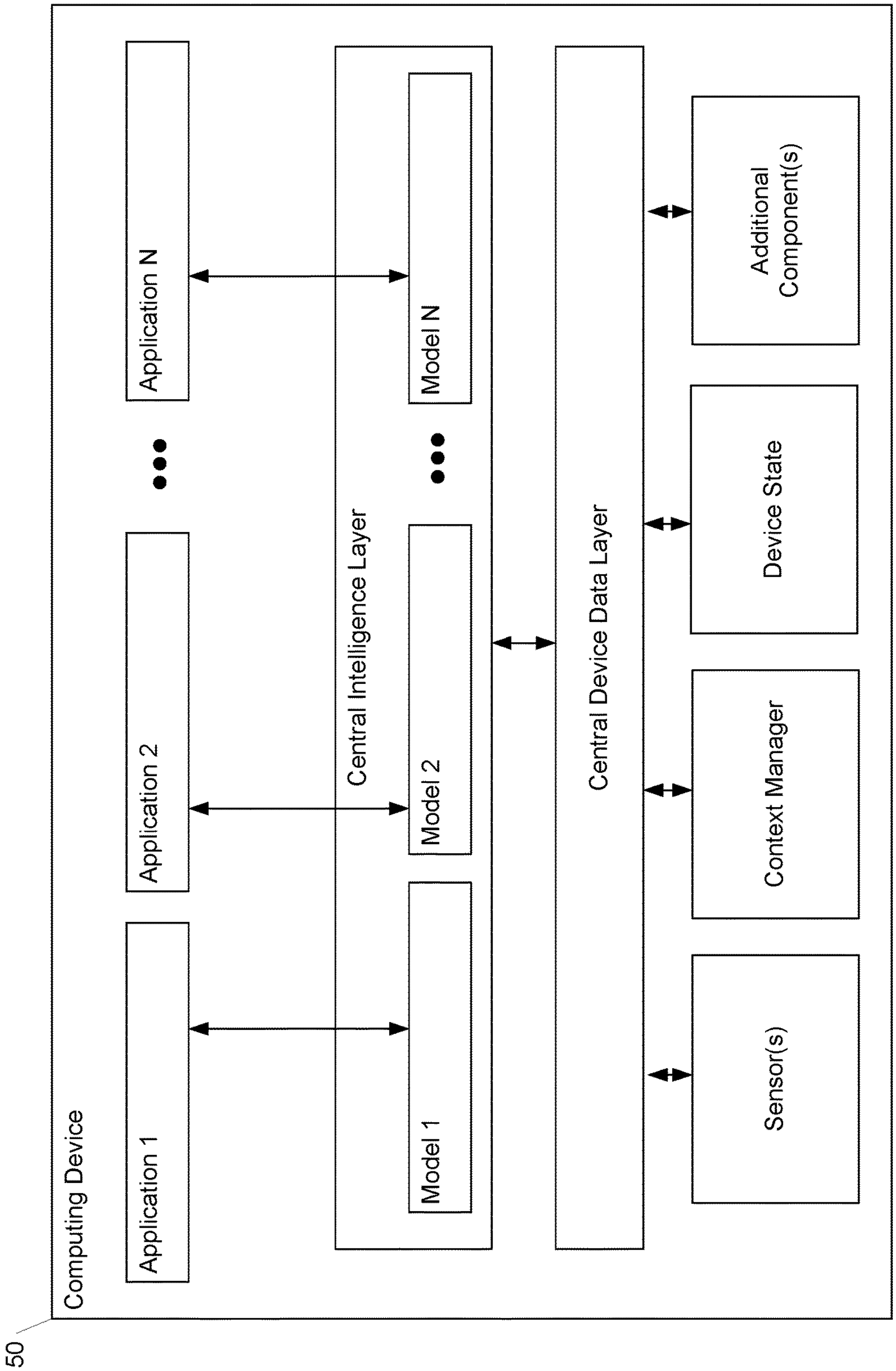
FIG. 1C depicts a block diagram of an example computing device according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Figure 2:
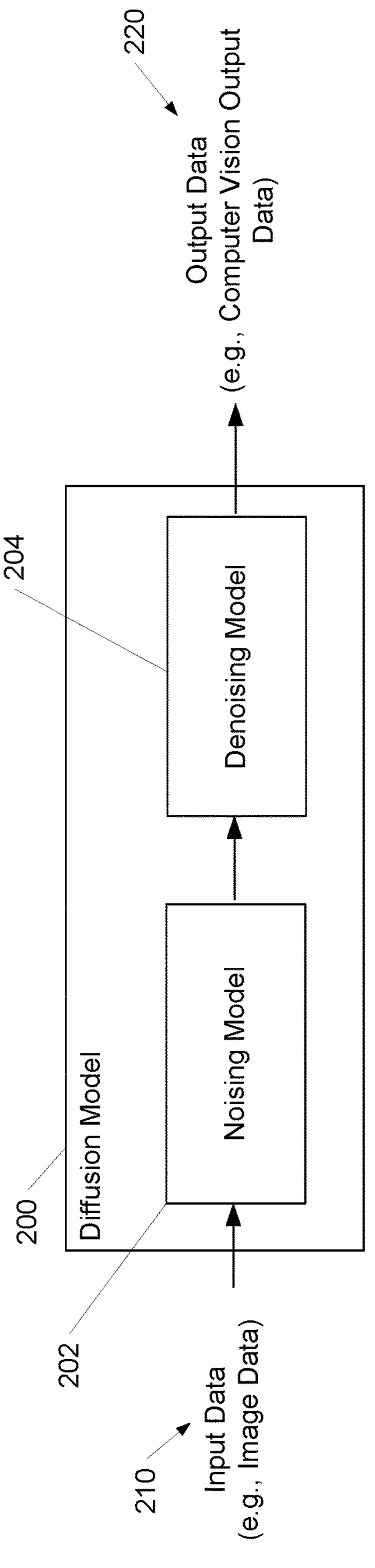
FIG. 2 depicts a block diagram of an example diffusion model according to example embodiments of the present disclosure.

FIG. 2 depicts a block diagram of an example diffusion model 200 according to example embodiments of the present disclosure. In some implementations, the diffusion model 200 is trained to receive a set of input data 210 and, as a result of receipt of the input data 210, provide output data 220. The diffusion model can include a noising model 202 and a denoising model 204.

Figure 3:
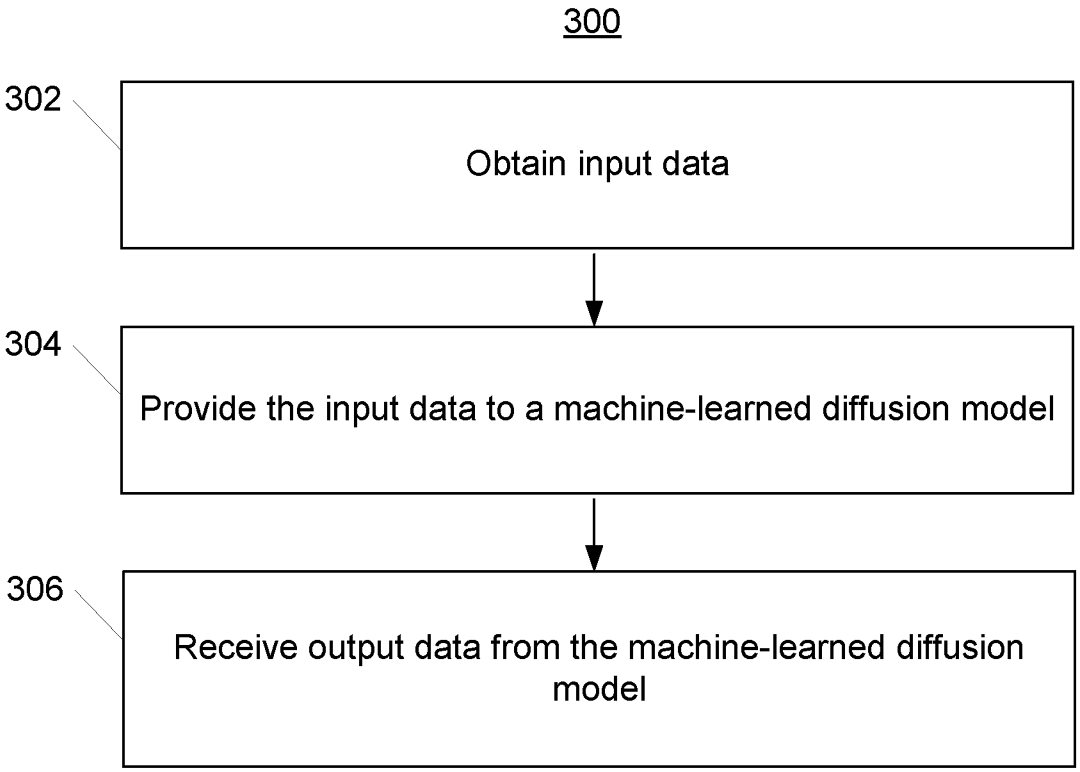
FIG. 3 depicts a flow chart diagram of an example method according to example embodiments of the present disclosure.

FIG. 3 depicts a flow chart diagram of an example method for use of a diffusion model having improved accuracy according to example embodiments of the present disclosure. Although FIG. 3 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

The method 300 can include, at 302, obtaining, by a computing system comprising one or more computing devices, input data, the input data comprising one or more channels. For instance, the input data can be image data.

The method 300 can include, at 304, providing, by the computing system, the input data to a machine-learned diffusion model. The diffusion model can include a noising model comprising a plurality of noising stages, the noising model configured to introduce noise to receive the input data and produce intermediate data in response to receipt of the input data and a denoising model configured to reconstruct output data from the intermediate data.

The method 300 can include, at 306, receiving, by the computing system, the output data from the machine-learned diffusion model. For instance, the output data can be reconstructed input data.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system that leverages Fourier features for improved fine scale prediction, comprising:

one or more processors; and one or more non-transitory, computer-readable media that collectively store:

at least a denoising model of a machine-learned diffusion model, the diffusion model comprising:

a noising model comprising a plurality of noising stages, the noising model configured to receive input data and produce latent data according to a noise schedule in response to receipt of the input data, wherein the noise schedule is a learned noise schedule that comprises one or more learned parameter values; and the denoising model configured to reconstruct output data from the latent data;

wherein input to the denoising model comprises a set of Fourier features comprising a linear projection of channels of at least one stage of the plurality of noising stages; and instructions that, when executed by the one or more processors, cause the computing system to execute the denoising model to process the latent data to generate the output data; and wherein the latent data comprises a compressed representation of the input data and the output data comprises a decompressed representation of the input data.

2. The computing system of claim 1, wherein the set of Fourier features comprises a linear projection of the channels of each of the plurality of noising stages.

3. The computing system of claim 1, wherein the set of Fourier features comprises a linear projection of at least one stage of the plurality of noising stages onto a set of periodic basis functions with high frequency.

4. The computing system of claim 1, wherein the set of Fourier features comprises four channels.

5. The computing system of claim 1, wherein the input data comprises a bit length, and wherein the set of Fourier features comprises Fourier features having each frequency from one to the bit length.

6. The computing system of claim 1, wherein the input data comprises a bit length of eight or greater, and wherein the set of Fourier features comprises Fourier features having each frequency from seven to the bit length.

7. The computing system of claim 1, wherein the input data comprises image data.

8. One or more non-transitory, computer-readable media collectively storing:

a diffusion model comprising:

a noising model comprising a plurality of noising stages, the noising model configured to introduce noise to input data according to a noise schedule to produce intermediate data; and a denoising model configured to reconstruct output data from the intermediate data;

wherein the noise schedule is a learned noise schedule that comprises one or more learned parameter values; and instructions that, when executed by one or more processors, cause a computing system to execute the diffusion model to process the input data to generate the output data.

9. The one or more non-transitory, computer-readable media of claim 8, wherein the learned noise schedule comprises a ratio of a squared mean of a marginal distribution of the diffusion model to a squared variance of the marginal distribution.

10. The one or more non-transitory, computer-readable media of claim 8, wherein the learned noise schedule is learned jointly with the diffusion model.

11. The one or more non-transitory, computer-readable media of claim 8, wherein the learned noise schedule comprises a signal-to-noise ratio function.

12. The one or more non-transitory, computer-readable media of claim 8, wherein the learned noise schedule is parameterized by a monotonically increasing function.

13. The one or more non-transitory, computer-readable media of claim 12, wherein the monotonically increasing function comprises a monotonically increasing neural network.

14. The one or more non-transitory, computer-readable media of claim 13, wherein the monotonically increasing neural network comprises one or more linear layers that are restricted to be positive.

15. The one or more non-transitory, computer-readable media of claim 8, wherein a derivative of a loss function with respect to the noise schedule is computed along with gradients of parameters of the diffusion model other than the one or more learned parameter values of the diffusion model without a second backpropagation pass through the denoising model.

16. The one or more non-transitory, computer-readable media of claim 8, wherein parameters of the learned noise schedule are learned by maximizing an evidence lower bound together with other parameters of the diffusion model.

17. The one or more non-transitory, computer-readable media of claim 8, wherein the diffusion model is a continuous time diffusion model, and wherein the parameters of the learned noise schedule are learned by optimizing an evidence lower bound with respect to endpoints of the learned noise schedule.

18. The one or more non-transitory, computer-readable media of claim 8, wherein parameters of the learned noise schedule are learned by minimizing variance by performing stochastic gradient descent on a squared diffusion loss.

19. A computer-implemented method for training a diffusion model, the method comprising:

obtaining, by a computing system comprising one or more computing devices, training data, the training data comprising one or more channels;

providing, by the computing system, the training data to a machine-learned diffusion model, the machine-learned diffusion model comprising:

a noising model comprising a plurality of noising stages, the noising model configured to introduce noise to the training data according to a learned noise schedule that comprises one or more learned parameter values and produce intermediate data in response to receipt of the training data; and a denoising model configured to reconstruct output data from the intermediate data; and determining, by the computing system, a training loss based at least in part on use of the machine-learned diffusion model with the training data, wherein the diffusion model is trained by optimizing parameters of the machine-learned diffusion model towards an evidence lower bound, wherein the evidence lower bound comprises a continuous-time loss.

20. The computer-implemented method of claim 19, wherein the continuous-time loss is approximated using an unbiased estimator of the continuous-time loss.

21. The computer-implemented method of claim 20, wherein the unbiased estimator comprises a Monte Carlo estimator.

22. The computer-implemented method of claim 19, wherein the continuous-time loss comprises infinite depth.

* * * * *